Sept. 7, 1954    C. E. BOWERS    2,688,417
OUTLET BOX
Filed Dec. 21, 1948    2 Sheets-Sheet 2
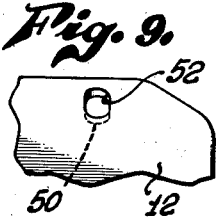
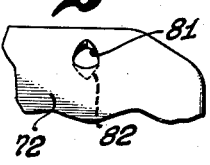
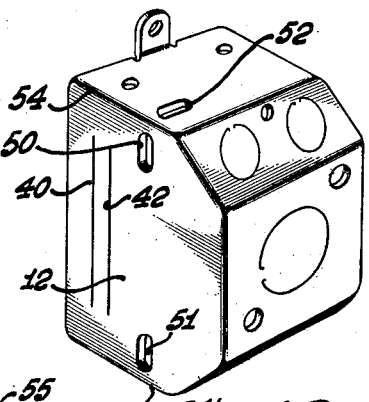
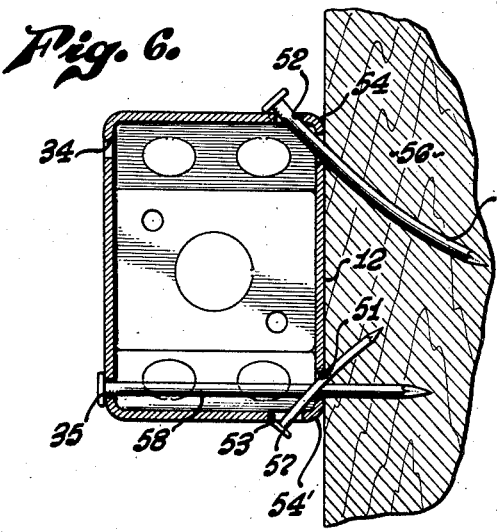
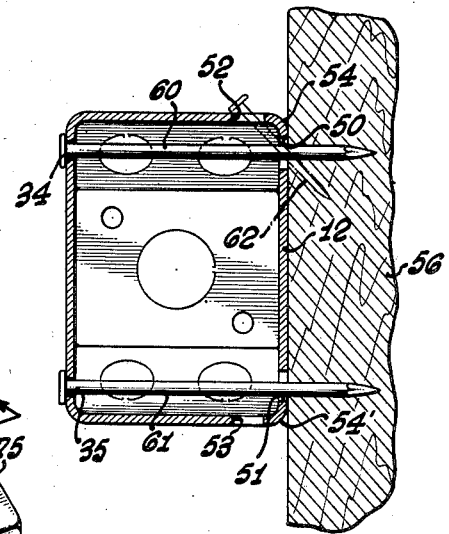
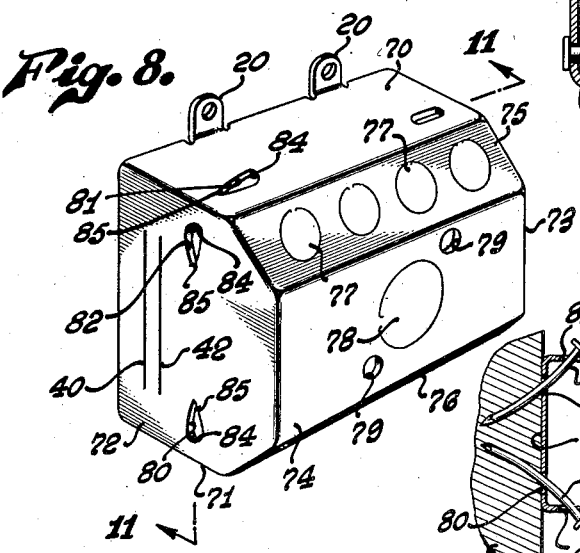
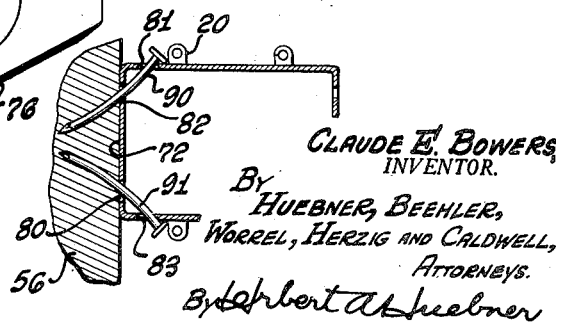
CLAUDE E. BOWERS
INVENTOR.
BY HUEBNER, BEEHLER,
WORREL, HERZIG AND CALDWELL,
ATTORNEYS.
By Herbert A. Huebner Patented Sept. 7, 1954

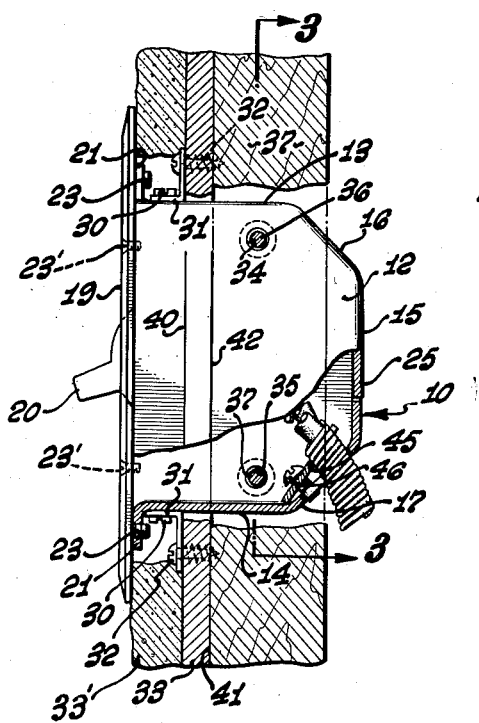

2,688,417

UNITED STATES PATENT OFFICE 2,688,417

OUTLET BOX

Claude E. Bowers, Beverly Hills, Calif.

Application December 21, 1948, Serial No. 66,450

1 Claim. (Cl. 220—3.9)

This invention relates to outlet boxes and more particularly to a new and improved outlet box incorporating novel and improved mounting and positioning means therefor.

Outlet boxes in general use heretofore have been formed of several parts, bolted or otherwise secured together, involving numerous manufacturing operations, and resulting in structures lacking in ruggedness and having undesirable exposed edges and bolts. I have discovered that a box of the character described can be drawn from a blank and that a box so made will not only be durable but will have smooth surfaces and corners.

By the instant invention it is intended to provide an electrical outlet box of improved rugged construction capable of mass production at relatively low cost and wherein improved mounting devices are utilized for secure and firm mounting of the box in a unique manner without added structural framework or other improvisation.

By the instant invention it is also intended that the box in either its mounted or unmounted condition may be used either in old or new work for knocking out wall board or the like or trimming the same therearound without distortion of the box or weakening of its support.

In addition, it is intended that in new work, particularly, conventional clamps, brackets and the like may be dispensed with and the box firmly secured against more rigid structural elements such as studs or similar supports.

Pursuant to the above intendments, it is an object of this invention to provide a new and improved, preferably one-piece, outlet box of improved simple and rugged construction susceptible of economical mass production.

Another more specific object of the invention is the provision in an electrical outlet box of the desired character described, of new and improved gauge means by which the box may be accurately positioned as in the studding or other framework of an unfinished wall with respect to a projective wall board, plaster board, or lath-and-plaster surface.

Other more specific objects of the invention include the formation in a preferably single-piece box of drawn sheet metal of appropriately spaced and shaped slots and/or other holes adapted to accommodate nails, screws, or the like, securement by the sole means and co-action of which, with the box, and preferably as suggested by guide indicia provided, the box may be simply, directly, accurately and solidly installed.

It is moreover among the objects of this invention to provide an outlet box of new and improved features of installation convenience, strength and adaptability as compared with prior art outlet boxes intended to accomplish generally similar objectives.

With these and other objects in view, the invention consists in the construction, arrangement and combination of the various parts of the device whereby the objects contemplated are attained, as hereinafter set forth, pointed out in the appended claims, and illustrated in the accompanying drawings.

In the drawings:

Figure 1 is a perspective view of a preferred single form of receptacle or box.

Figure 2 is a side elevational view, partially in section, illustrating the same as mounted in a wall segment.

Figure 3 is a front sectional elevational view of the same, taken as on a line 3—3 of Figure 2.

Figure 4 is illustrative of another mode of mounting.

Figure 5 is a modified form of box construction.

Figure 6 is a front sectional elevational view of the same, illustrating one means of mounting the same adjacent a stud.

Figure 7 is a view similar to Figure 6 illustrative of another mode of mounting the same.

Figure 8 is a further modified form of box construction embodying this invention.

Figure 9 is a diagonal view upwardly as on a central line passing through companion slots 50 and 52 of the embodiment of Figure 5, other parts of said box being cut away.

Figure 10 is a diagonal view downwardly as on a central line passing through companion slots 81 and 82 of the embodiment of Figure 8, other parts of said box being cut away.

Figure 11 is a vertical sectional view as on a line 11—11 of Figure 8, the box of said figure being secured to a stud as contemplated by this invention.

Referring more particularly to the drawings, and specifically to Figures 1 through 4, an electrical loom and conduit switch or outlet box is designated by way of illustration, and not of limitation, generally by the numeral 10.

In gross, the box comprises side walls 11 and 12 and end or top and bottom walls 13 and 14, respectively, a rear wall 15 and diagonal wall portions 16 and 17. The foremost edges of the walls 11, 12, 13 and 14 define a front opening 18, normally closed in use in any conventional manner as by a cover plate 19 secured as to a switch 20 held by any appropriate ears 21 usually turned outwardly, as shown, or inwardly, in either case preferably lying in the plane of the front opening 18. The ears may be drilled and tapped as at 22 to accommodate the customary screws 23 for securement of the switch to which the cover plate is then suitably applied as by screws 23'.

Any conventional knock-outs 24, 25 and 26, for example, may be positioned in the usual manner over corresponding conduit ports. Likewise, usual nail holes, as 27 and 28 in the top and rear walls, respectively, may be included if desired.

As illustrated most clearly in Figure 2, some of the holes 27 may accommodate screws 30 designed to adjustably and removably support clamps, brackets or the like 31 by which means, particularly in old work, the outlet box may be fixed in place, viz., by wood screws 32 engageable in lathing or other wall board or plaster, as the case may be, cf. lath 33 and plaster 33'.

It is preferable, however, that a stronger, more convenient and universal securement be provided for the box and for this purpose holes 34 and 35 are formed in the side walls preferably adjacent the end walls 13 and 14 so as to clear the working parts of any switches, plug connections and the like (not shown) which may be held within the outlet box in a usual manner.

Through such holes 34 and 35 a securing means preferably such as common nails 36 may be inserted and driven into an adjacent stud or the like 37 wherever possible. In old work this is not always conveniently achieved so that shorter screws or nails may be employed which extend only through one wall 12, for example, directly adjacent the stud 37.

Nails 38 in appropriate locations, as where studs are not conveniently located adjacent the side walls 11 and 12 of the outlet box, may be driven through the holes 28 and into other framing or studding 39, as illustrated in Figure 4. Even in such installations it is desirable wherever possible to utilize additionally the transverse nailing, illustrated most clearly in Figures 2 and 3.

It will be noted that an index or guide line 40 is inscribed as in a side 12 of the outlet box which will conform to a wall board finish or the like, the total thickness of which is less than a wood lath and plaster wall but which may also approximate the thickness of a plaster-type wall supported as on metal-type lath or the like. Another index line 42 inscribed in said side wall parallel to the first line 40 but in normal alignment (as shown) with the outer surface 41 of the studding 37 may establish the proper position of the stud edge 41 where a lath-and-plaster, button board and plaster, or the like wall finish is contemplated, said line 42 then being aligned with the outer edge 41 of the studding. Depending, therefore, upon the nature of the wall finish as completed or proposed, the lines 40 and 42 may be conveniently employed to accurately position the outlet box. Said lines need be inscribed on only one side 11 or 12 inasmuch as the box may be symmetrical and invertible for engagement of either side against a desired support.

Adjustable, removable loom clamps 45 secured in place by any screws 46 may be self-threaded through holes 47.

The modified form of outlet box construction illustrated in Figures 5, 6 and 7, except for modifications to be noted, may be similar to the preceding embodiment and, accordingly, like parts therein are designated by like numerals. In the modified box, slot holes 50 and 51, optionally additional to the holes 34 and 35 of the previous embodiment but preferably in the exact location thereof, are formed in the side walls 12. Other slot holes 52 and 53 in alignment with and adjacent to the corresponding slots 50 and 51 are formed at corners 54 and 54', preferably, though not necessarily, on only one side 12 of the box which, as heretofore stated, may be symmetrical and hence invertible or reversible, so that either side may with equal facility be placed against an adjacent stud.

In the use of the modified form of the box, the cooperating slots 52 and 50, for example, are designed to closely accommodate and bind against a toed nail 55 which is thereby held both in a position to be accurately driven and as driven into the stud 56.

If desired, an additional relatively smaller toed nail 57 may be driven diagonally through the slots 53 and 51 and into the stud 56. The smaller nail 57 thereby serves to bind tightly against the larger nail 58 and prevent its retraction from the box while more firmly securing the box to the stud. Where desired, one nail 55 may be toed, as shown, and the other 58 may be driven transversely through the box by means of the hole 35 and aligned slot 51 without necessarily employing any such toenail as 57.

During the process of driving the toed nail 55 (and also incidentally the smaller nail 57 but in a different manner) through the slots 52 and 50, the positioning and shape of the holes with respect to one another may be such as to cause a bending or warping of the nail as illustrated. This feature will be more fully discussed in the description of Figures 8 and following.

Figure 7 is illustrative of another form of securement of the box to the stud 56 in which two nails 60 and 61 may be driven transversely through the holes 34 and 35 and slots 50 and 51, and smaller nails 62 may optionally be employed in the manner illustrated and heretofore described, i. e., by toeing the same to clinch the larger nails and to more firmly secure the box in place.

In the further modified form of box of Figure 8, a multiple outlet or receptacle type box has been selected as illustrative and may similarly comprise top and bottom ends 70 and 71, sides 72 and 73, a back wall 74 and oblique wall portions 75 and 76. Any suitable knock-outs 77 and 78 may be provided in a conventional manner as may also any nail holes 79.

Tapered slots, as 80, 81, 82 and 83, for toenails may be provided at either side of the box and also in the top and bottom thereof, or even, though not shown, at the back. It may be desirable, however, that some of said slots be tapered, as illustrated, whereby a wide end 84 may not only more readily accommodate a transverse nail, passing through the box from side to side, but also so that the narrower end 85 of the slots (whether rounded or brought to a point) may accommodate toed nails of larger or smaller size as may be desirable or necessary for clamping either or both of the transverse nails in position. The wide part of the slots may accommodate any nails, not shown, driven vertically downwardly through the box from top to bottom and thence into a bottom, horizontal or other supporting framework while a toenail may be driven through said companion slots and into an adjacent vertical stud as heretofore set forth.

The slots are positioned in a parallel plane, adjacent the rounded corner of the box and also spaced inwardly from the front and back of the box almost intermediate between front and back.

This positioning, whether of slots or round holes, approximately midway between front and back of the box, fairly well divides any leverage or strain that might be laterally exerted upon the box and tend to twist it out of position on the stud.

Figures 9 and 10 are intended to illustrate the appearance of the companion slots 50 and 52 of Figure 5 looking upwardly diagonally through the centers of both of them, and similarly, to indicate the appearance of the companion slots 81 and 82 looking diagonally downwardly through both of them, respectively. It will be seen in both of said figures that a straight line projection passing through companion slots will be non-circular in cross-section and will be thicker on a horizontal axis than on a vertical axis taken on said straight line projection. Thus in the use of a nail conforming to the widest, i. e., horizontal measurement, the same will be warped out of its normal straight line configuration in a vertical direction in said figures.

This distortion and warping of any such nails is further illustrated in Figure 11 wherein nails driven in opposite diagonal relationship are shown to be bent relatively away from one another as they are driven into the stud 56.

The dimensions of each slot in each embodiment showing slots are preferably such that the width is sufficient to readily accommodate a nail of the size normally intended to be used, as for example, an eight penny nail, and the length of the slot 81 (Fig. 8) for example, in relation to the length of the companion slot 82 and their respective positions are so established that the nail chosen will readily pass through the first slot 81 it enters and may be started through the companion slot, the nail being driven at an angle of approximately 45°; but the position and effect of the two slots is such that when the full diameter of the nail enters the companion slot 82 a binding action occurs which warps the nail due to the fact that the effective hole or passage for the nail formed by the two slots is not a complete circle but is somewhat flattened vertically as seen most clearly in Figure 9.

In other words, the nail cannot be driven straight through both slots into the studding. It binds upon the ends and/or sides of the slots either at their inner or outer edges, i. e., formed by the inside or outside surfaces of the box, depending on the size, shape and/or relationship of the companion slots including, without limitation, such factors as whether the narrow or wide ends of the slots in question face in opposite or similar directions. The sharp edges of the slots tend to bite into the nail causing the same to more firmly engage the box and consequently, and simultaneously also, affording a more rigid hook-like mounting of the box on the stud, as shown by nails 90 and 91 in Figure 10, for example. The nails when driven are thus warped, hook-fashion.

Again, this effect may be increased, if desired, by forming the slots with a tapered pattern, as shown in Figure 8, the larger width of the slot conveniently accommodating the nail and the narrower end of the slot being less than the diameter of the normal nail used whereby the binding effect is obtained, and the amount of desired warping controlled as in similar fashion to slots of non-tapered form.

The instant box is preferably solid so that it may be used as a knife or anvil for breaking out wall board or similar material against its front edge conforming to its exact over-all dimension.

The boxes may be of a single, double or multiple type whether usable for plugs, switches or other forms of electrical outlets and are preferably commercially produced from approximately fourteen-gauge steel, from which they may be drawn in one operation, as heretofore stated, and the edge 18 trimmed by any suitable means as by a shimmy die. The resultant construction is of one piece, simple and strong and will resist deformation, while the entirety, including the openings therein, may be accurately formed therein immediately following the drawing operation without distortion or possibility of misalignment.

While nail sizes or relative proportions of the nails to one another or to the holes and slots accommodative of the same may, of course, be varied to suit conditions, the invention features the provision of a rugged and economically produced outlet box of single, double or multiple-gang type having novel and convenient positioning indicia formed in at least one side thereof and having new and improved tapered or plain slotted and/or rounded holes accommodative of transversely vertically and/or diagonally-driven nails which, if used singly, are of the preferred size of eight penny common for supporting, binding, and preventing relative slippage between the box and the nail or adjacent framework.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

An electrical outlet box comprising side walls and end walls forming a rectangular box with vertical corners and an open face, and a rear wall forming a bottom for said box, one of said end walls having an elongated slot adjacent to but spaced from each adjacent side wall with the long axis perpendicular to the vertical corners formed between said end wall and said adjacent side walls, said slots being located substantially midway between the rear wall and the open face, each of said slots tapering from a wide curved end to substantially a point at the other end thereof, each adjacent side wall having a similar shaped slot spaced from said last-named vertical corners at a distance substantially equal to the spacing of the corresponding slot in the end wall, said slots having their long axis lying in substantially the same plane and constituting a pair of slots adjacent each of said vertical corners, and one slot of each pair converging toward and the other away from its adjacent vertical corner.

References Cited in the file of this patent

UNITED STATES PATENTS

| Number | Name | Date |
| --- | --- | --- |
| 691,874 | Robinson | Jan. 28, 1902 |
| 1,262,988 | Siefert | Apr. 16, 1918 |
| 1,302,057 | Knight | Apr. 29, 1919 |
| 1,776,126 | MacMillen | Sept. 16, 1930 |
| 1,815,393 | Andrews | July 21, 1931 |
| 1,935,574 | Munroe | Nov. 14, 1933 |
| 2,143,278 | Myers | Jan. 10, 1939 |